United States Patent [19]
Ettre et al.

[11] 3,919,452
[45] Nov. 11, 1975

[54] PRECISION BONDING SYSTEM

[75] Inventors: Kitty S. Ettre, Norwalk, Conn.;
George Richard Castles, Fitzwilliam, N.H.; Aloyzas Petrikas, Wilton, Conn.

[73] Assignee: Vitta Corporation, Wilton, Conn.

[22] Filed: Oct. 23, 1973

[21] Appl. No.: 408,501

[52] U.S. Cl. .......... 428/325; 156/106; 350/160 LC; 428/1; 428/34; 428/69; 428/188; 428/194; 428/195; 428/210; 428/308; 428/323; 428/426; 428/428
[51] Int. Cl.² ... B32B 17/06; B32B 3/02; B32B 7/14
[58] Field of Search .......... 161/162, 164, 166, 168, 161/DIG. 5, 192, 193, 406; 156/106, 109; 350/160 LC

[56] References Cited
UNITED STATES PATENTS

| | | | |
|---|---|---|---|
| 2,273,733 | 2/1942 | Paddock | 161/DIG. 4 X |
| 3,176,584 | 4/1965 | DeVries et al. | 161/406 X |
| 3,293,072 | 12/1966 | Doolittle et al. | 117/138.8 |
| 3,558,422 | 1/1971 | Hamilton et al. | 156/330 X |
| 3,574,029 | 4/1971 | Ettre | 156/231 |
| 3,592,526 | 7/1971 | Dreyer | 350/147 X |
| 3,616,174 | 10/1971 | Atkins | 161/DIG. 5 |
| 3,661,444 | 5/1972 | Matthies | 350/160 LC |
| 3,748,017 | 7/1973 | Yamamura et al. | 350/160 LC |
| 3,778,126 | 12/1973 | Wilson | 65/58 |
| R27,911 | 2/1974 | Dreyer | 350/160 LC |

*Primary Examiner*—George F. Lesmes
*Assistant Examiner*—Alan T. McDonald
*Attorney, Agent, or Firm*—Mattern, Ware and Davis

[57] ABSTRACT

By providing a sealing system for bonding which incorporates a sealing cement and at least three spacers disposed within said sealing cement, two members can be easily and securely bonded together with a precise separation gap between them and with the lateral flow of the sealing cement precisely controlled. Preferably, spherical spacers are employed having a diameter equal to the spacing desired between the members being joined, and the sealing cement incorporates a thermal expansion compatible with the thermal expansion of the members being joined.

13 Claims, 5 Drawing Figures

PRECISION BONDING SYSTEM

This invention relates to precise bonding systems, and more particularly to bonding systems for securely joining two members with a precise separation gap therebetween.

BACKGROUND OF THE INVENTION

In the prior art, bonding of two members is generally achieved by painting sealing cement on one or both of the members to be bonded, positioning the other member in the desired juxtaposed location, and then thermally curing the sealing cement.

Also, in some prior art sealing systems, a sealing cement transfer tape is employed. The transfer tape is solid at room temperature and is preformed into the shape desired to cover the sealing area. The tape is placed on the sealing area of one or both of the members, the second member is placed in its juxtaposed position, and the entire assembly is heated to cure or, as described above, solvents are employed to achieve the desired bond.

These prior art sealing systems achieve an intimate bond between the members; however, when it is important to have a precise gap spacing maintained between the two members being joined, fixtures must be employed to assure that the desired gap spacing is achieved. Such fixtures are extremely expensive, difficult to employ, and add considerable cost to the final product.

Another problem with prior art systems is that the amount of pressure which is applied to the members being joined must be precisely controlled in order to assure that the desired thickness between the members is maintained, while also preventing unwanted squeeze-out of the sealing cement or, alternatively, insufficient bonding contact between the members and the sealing cement. The necessity for these precise controls and expensive equipment makes such sealing systems extremely expensive and difficult to employ, resulting in a final product which is very costly.

Therefore, it is a principal object of this invention to provide a bonding system which is relatively inexpensive and capable of maintaining a precise separation gap between the members being bonded.

Another object of this invention is to provide the bonding system of the above character which is easily employed with ordinary equipment.

Another object of this invention is to provide a bonding system of the character described above which prevents undesirable squeeze-out of the sealing cement, maintains a controlled spread of the sealing cement, and assures an intimate bond between the members being joined.

A further object of this invention is to provide a bonding system of the character described above which provides greater flexibility in the controls required for the bonding pressure.

Other and more specific objects will in part be obvious and will in part appear hereinafter.

SUMMARY OF THE INVENTION

In the precision bonding system of this invention, at least three spacers are disposed within the sealing cement. These spacers can comprise substantially any shape desired and be made from virtually any type of material; however, in the preferred embodiment it has been found that high temperature glass balls provide the best quality spacer. The critical dimension of the spacer, which in the case of a glass ball is its diameter, should be equal to the separation gap desired between the members being bonded. When the sealing cement is being cured, the cement becomes fluid. As a result, the dimension of the spacer which separates the members being bonded serves as the critical dimension which establishes and maintains the separation gap. As a result, it is important to select a spacer with the desired dimensions, and critical to position the spacer in the cement in such a manner that the critical dimension of the spacer will maintain the desired separation gap.

In bonding applications where the sealing area must be controlled, such as where the sealing area available is limited or where an area exists in which cement cannot be present, the quantity of sealing cement employed and the pressure used to maintain the two members together during bonding must be closely controlled along with the spacer dimension. It has been found that when curing the sealing cement at elevated temperatures, approximately fifty percent shrinkage occurs in the sealing cement. As a result, a controlled quantity of sealing cement must be present to assure that there is sufficient cement for the intimate bond desired, while also assuring that too much cement is not present, which could result in squeeze-out or lateral flow into the non-desired areas. Furthermore, the pressure applied to the members during the bonding process must be controlled to maintain the members in intimate contact with the sealing cement, while not exerting too much pressure, which may result in squeeze-out or unwanted lateral flow.

In the preferred embodiment, the quantity of sealing cement is maintained by controlling the thickness of the sealing cement employed. This is best achieved by using the sealing cement in the transfer tape form which is precut into the desired size and shape. Both the cement thickness and required pressure are determined for each particular application and, once established, become the standard for that particular application.

As is well known in the art, another factor which must be considered is the use of a sealing cement which has a thermal expansion that is compatible with the thermal expansion of the members being bonded. This factor must be considered when the bonded members may be heated to various temperature levels; since, if the sealing cement will not have a thermal expansion compatible with the thermal expansion of the members bonded together, cracking of the cement will occur, resulting in a breakdown of the bond.

From the above description, it would be obvious to one skilled in the art that the precision bonding system of this invention has many different applications, and depending upon the particular application involved, some or all of the various factors discussed must be considered and taken into account. Once the spacers having the critical dimension desired have been securely positioned in the sealing cement and, if necessary, the quantity or thickness of cement, the thermal expansion of the cement, and the sealing pressure have all been established, the intimate precision bond can be achieved.

During the curing process, the sealing cement becomes fluid and, in accordance with its own physical characteristics, begins to shrink. Furthermore, the members being bonded together are forced more closely together under the pressure being applied to the members during the curing process. However, with the use of the spacers in the bonding system of this invention, the members being bonded are unable to be forced more closely together than the critical dimension of the spacer employed. As a result, the members are intimately bonded together while the spacers assure that the desired separation gap is maintained.

The invention accordingly comprises the several steps and the relation of one or more of such steps with respect to each of the others, and the apparatus embodying the features of construction, combination of elements and arrangement of parts which are adapted to effect such steps, all as exemplified in the following detailed disclosure, and the scope of the invention will be indicated in the claims.

THE DRAWINGS

For a fuller understanding of the nature and objects of the invention, reference should be had to the following detailed description, taken in connection with the accompanying drawings, in which.

DETAILED DESCRIPTION

Figure 1:
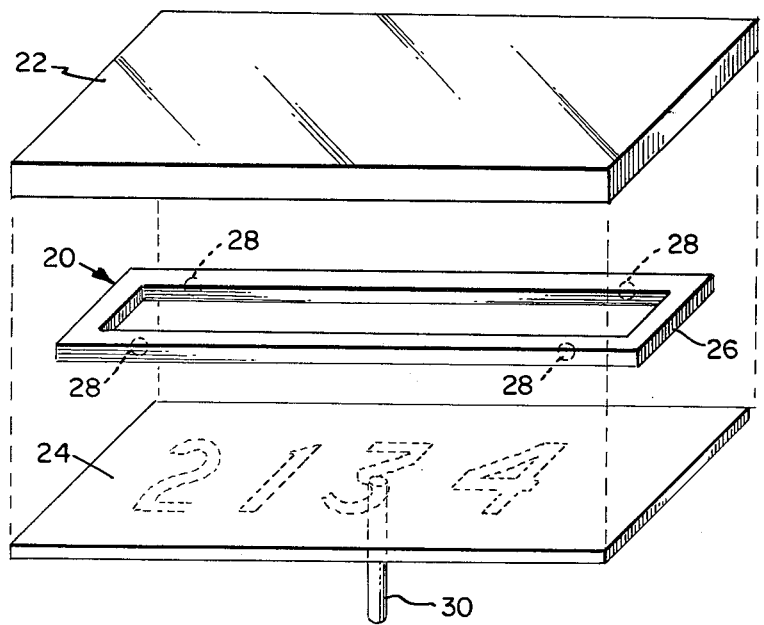
FIG. 1 is an exploded perspective view showing the precision bonding system of this invention positioned between two members to be bonded.

In FIG. 1, the precision bonding system 20 of this invention is shown positioned between a glass member 22 and a ceramic member 24, ready for bonding of members 22 and 24 to each other. Bonding system 20 comprises sealing cement 26 in a pre-cut transfer tape form, with spacers 28 disposed within sealing cement 26.

In the preferred embodiment, spacers 28 comprise high temperature spherical glass balls comprising a diameter equal to the gap space desired for separation of member 22 from member 24. Also, although a minimum of three spacers may be employed to properly maintain the desired gap separation between members 22 and member 24, it has been found that four spacers 28, as shown in FIG. 1, provide better load distribution. As will be obvious to one skilled in the art, the use of additional spacers, when properly distributed throughout the sealing cement, would provide an even greater load distribution.

Figure 3:
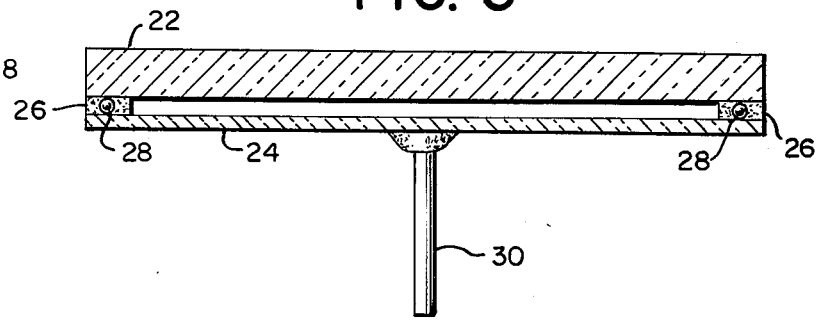
FIG. 3 is a cross-sectional side elevation view showing the two members of FIG. 1 intimately bonded by means of the bonding system of this invention.
Figure 5:
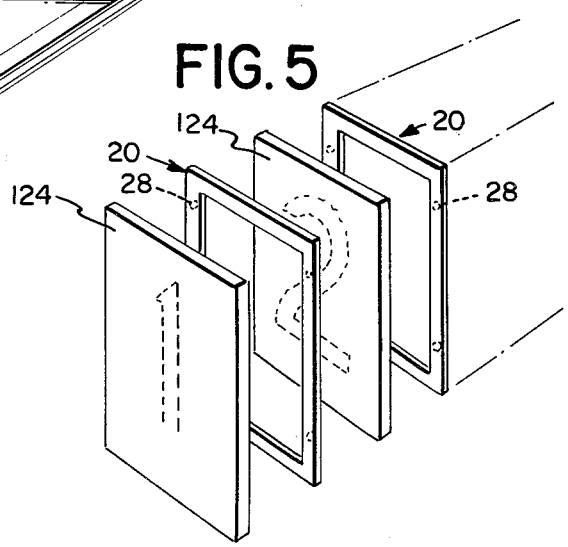
FIG. 5 is a perspective view showing the bonding system of this invention being used for bonding a liquid crystal display.

In FIGS. 1 and 3, a gas discharge device for an electric calculator digital read-out is shown, in order to clearly describe one application for the precision bonding system of this invention. However, the use of this bonding system for gas discharge devices is merely exemplary of many other bonding applications in which the bonding system of this invention can be used in order to maintain a precision gap between the members being bonded. Another such application in which the precision bonding system of this invention can be employed is in liquid crystal devices, as shown in FIG. 5, where precision gap spacing is required. However, the bonding system of this invention is not limited to bonding glass or ceramic material, but can be employed to intimately join any bondable materials.

In the embodiment shown in FIG. 1, it is desired to bond glass member 22 to ceramic member 24 with a gap spacing of 0.023 inches. In order to achieve this gap spacing, spacer 28, which comprises a high temperature glass ball, has a diameter of 0.023 inches, with a tolerance of ±0.001 inches. Since it is extremely important to assure that the sealing cement does not flow into the digital readout area, the quantity of sealing cement must be controlled. As a result, sealing cement 26 is in the transfer tape form and is pre-cut to the exact size and shape of the sealing area available.

After much experimentation, it was discovered that sealing cement 26 must comprise a thickness of approximately 0.040 inches ±0.001 inches in order to assure that the proper quantity of cement is present to provide a secure, tight bond between members 22 and 24. The proper quantity of sealing cement is extremely important in order to assure that there is sufficient sealing cement present to account for the shrinkage of the sealing cement when it is fired, while also not having too much sealing cement, which may otherwise result in unwanted run-out or spread of the sealing cement into the non-sealing area. The particular quantity or thickness of sealing cement required in a specific application with a different gap thickness must be experimentally determined, based upon the characteristics of the sealing cement being employed.

Although spacer 28 in this preferred embodiment comprises a high temperature glass ball, any particular shaped article having a higher melting point than the temperature being employed to fire the sealing cement or having resistance to the solvents employed for firing the sealing cement can be employed. The only requirement is that the critical diameter — the distance that will act as the spacing distance between the members being joined — must be substantially equal to the desired gap spacing. However, it has been found that the glass ball is extremely useful in allowing the sealing cement 26 to flow around it, thereby preventing any gaps around the spacer. This is extremely important in providing the tight, secure bond desired.

The preferred sealing cement 26 employed in the bonding system of this invention for bonding glass member 22 to ceramic member 24 comprises finely powdered glass and metal oxides of a composition which, when held in suspension by a low viscosity vehicle, may be applied to a sealing area. When fired, the glass develops a partially crystalline structure, which results in a devitrified glass seal, much stronger and harder than the original glass. Such sealing glass composisitions are well known in the trade and are manufactured by such companies as Corning Glass Works under the trademark PYROCERAM, and Owens-Illinois Corporation under the tradenames Kimble CV 110, Kimble CV 97, and Kimble CV 98.

In selecting the proper sealing cement, one important factor which must be considered, for applications in which temperature variations will occur, is the thermal expansion of the sealing cement. In the embodiment shown in FIG. 1, the high temperature glass plate 22 has a thermal expansion of about $85 \times 10^{-7}$ cm/cm/°C, while the ceramic member 24 has a thermal expansion of about $80 \times 10^{-7}$ cm/cm/°C. It has been found that for this particular application sealing cement 26 must comprise a thermal expansion between 80 and $90 \times 10^{-7}$ cm/cm/°C., and preferably a thermal expansion of $82.5 \times 10^{-7}$ cm/cm/°C. In actual construction, a sealing cement having a thermal expansion of $85 \times 10^{-7}$ cm/cm/°C. is employed and is found to be extremely effective. However, as would be obvious to one skilled in the art, the greater the dissimilarity between the thermal expansion of the sealing cement and the thermal expansion of the members being joined, the greater are the chances of a breakdown of the bond between the members during use at various temperature levels. Depending upon the particular use, other factors such as electrical properties and chemical resistivity might have to be considered in selecting the proper sealing cement.

Figure 2:
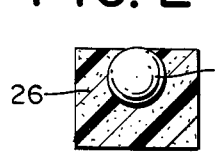
FIG. 2 is a cross-sectional side elevation view of the bonding system of this invention taken along line 2—2 of FIG. 1.

In the preferred embodiment, sealing cement 26 is manufactured in the transfer tape form. Such tapes are well known in the art and provide ease of handling of the sealing cement, since they can be cut and formed into the exact shape of the specific sealing area desired. In employing the bonding system of this invention, the pre-cut sealing cement 26 is first manufactured and then spacers 28 are positioned within the sealing cement. It has been found that two to three pounds of pressure are required in order to assure proper retention of the spacer 28 in the sealing cement 26. It is important to assure that spacer 28 is retained on or firmly within sealing cement 26 with virtually little or no portion of spacer 28 extending from sealing cement 26, as shown in FIG. 2. In this way, it has been found that secure and intimate bonding of the members without any crevices in the bonding system will be assured.

When firing the precision bonding system of this invention at elevated temperatures for the embodiment shown in FIG. 1, another factor which must be considered and controlled is the pressure applied during the heating operation. It has been found that, although the combination of spacers 28 with the proper amount of sealing cement 26 provides a secure, intimate bond between members 22 and 24, the use of too little pressure on an exterior surface of either member 22 or member 24 will not provide the desired intimate contact for secure bonding, while too much pressure will result in undesirable squeeze-out or lateral flow of the sealing cement outside of the bonding area. For this application, it has been found that pressure of between one-quarter of a pound and one pound can be employed, with one-half pound pressure being the optimum. The variation of the pressure employed depends upon the flatness of the ceramic surface being bonded. Furthermore, it has been found that the best results are achieved when the pressure is applied along the center line of sealing cement 26. Application of the pressure in this manner assures equal pressure distribution throughout the bonding system.

In FIG. 3, a bonded gas discharge device is shown in cross section, with glass member 22 intimately bonded to ceramic member 24 at a precise separation gap of 0.023 inches, as determined and maintained by spacers 28. Bonding cement 26 intimately surrounds spacer 28, assuring no crevices therein and providing a firm, intimate, bonded contact between members 22 and 24. Tube 30 is bonded to member 24, providing access to the sealed bonded area between members 22 and 24.

Figure 4:
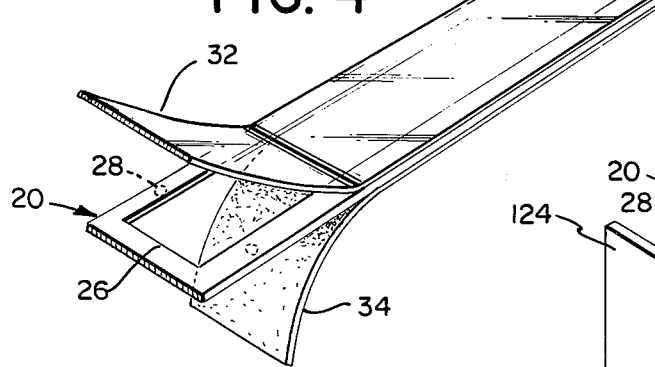
FIG. 4 is a perspective view of the precision bonding system of this invention in the transfer tape form.

In FIG. 4, the bonding system 20 of this invention is shown in its salable transfer tape form. Bonding system 20 comprises sealing cement 26 with spacers 28 firmly disposed on or within sealing cement 26. The salable product may also incorporate removable surface protection sheets 32 and 34. Although the use of one or two surface protection sheets is optional, in those applications in which a thin transfer tape is required a shape-retaining back-up sheet should be used to aid handling of the transfer tape. In the transfer tape form, the bonding system of this invention can be cut into any size or shape desired, with the precise quantity of sealing cement assured. The tape is ready for application to the sealing area and bonding of the members with the desired precise gap spacing.

In FIG. 5, the use of bonding system 20 with liquid crystals 124 is shown. In the manufacture of liquid crystal displays, it is important that a precise separation gap be maintained. By bonding a plurality of liquid crystals 124 together, using bonding system 20, the desired gap spacing can be precisely maintained.

It will thus be seen that the objects set forth above, among those made apparent by the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A sealing system for intimately bonding two members, with a precisely spaced separation gap comprising:
   A. sealing cement disposed between said two members about the sealing areas thereof, and
   B. at least three spacers disposed within said sealing cement, for maintaining a precise separation gap between said members when said cement is cured.

2. The sealing system defined in claim 1, wherein said spacers comprise a material having a higher melting point than the sealing cement.

3. The sealing system defined in claim 2, wherein said spacers comprise high temperature glass balls.

4. The sealing system defined in Claim 1, wherein said pre-formed transfer tape layer of sealing cement further incorporates removable surface protection sheets on at least one surface thereof.

5. The sealing system defined in claim 4, wherein said sheet comprises a shape-retaining back-up sheet.

6. The sealing system defined in claim 1, wherein said spacers are symmetrically substantially equidistantly disposed within said sealing cement.

7. The sealing system defined in claim 1, wherein at least a portion of each of said spacers is positioned within said sealing cement, assuring firm, secure retention thereby.

8. The sealing system defined in claim 1, wherein said spacers are positioned within said sealing cement with the outermost surface of said spacer substantially coextensive with one surface of said a pre-formed transfer tape layer of sealing cement.

9. A sealing system for intimately bonding two members of a gas discharge device with a precisely spaced separation gap in which an interior area of the gas discharge device must not have any sealing cement therein, comprising:
   A. a pre-formed, transfer tape layer of sealing cement of uniform thickness formed in the shape of a closed frame defining an open area in the center thereof, said closed frame substantially conforming to the sealing areas of said gas discharge device, and
   B. at least three uniformly sized and shaped spacers disposed within said transfer tape layer all of said spacers comprising substantially identical dimensions in the direction corresponding to the thickness of the transfer tape layer which is smaller than the thickness of the transfer tape layer.

10. A sealing system for intimately bonding liquid crystals devices with a precise separation gap therebetween comprising:
   A. a pre-formed transfer tape layer of sealing cement of uniform thickness formed in the shape of a closed frame defining an open area in the center thereof, said closed frame substantially conforming to the sealing areas of said liquid crystals, and
   B. at least three uniformly sized and shaped spacers disposed within said transfer tape layer all of said spacers comprising substantially identical dimensions in the direction corresponding to the thickness of the transfer tape layer said dimension being smaller than the thickness of the transfer tape layer.

11. The sealing system defined in claim 1, wherein said closed frame comprises four frame members each of which are perpendicular to adjacent frame members, forming a rectangularly shaped closed frame, and two of said spacers are positioned in oppositely facing frame members.

12. The sealing system defined in claim 11, wherein four spacers are disposed in said transfer tape layer in groups of two near the ends of said oppositely facing frame members.

13. A sealing system defined in claim 1, wherein said spacers comprise a geometric shape establishing a concave cavity in said sealing cement facing in the direction of said spacer.

* * * * *

UNITED STATES PATENT OFFICE
CERTIFICATE OF CORRECTION

PATENT NO. : 3,919,452
DATED : November 11, 1975
INVENTOR(S) : KITTY S. ETTRE, GEORGE RICHARD CASTLES, ALOYZAS PETRIKAS.

It is certified that error appears in the above-identified patent and that said Letters Patent are hereby corrected as shown below:

<u>Column 6, lines 39-46</u>   Please correct Claim 1 to read as follows:

1. A pre-formed sealing system for intimately bonding two members with a precisely spaced separation gap therebetween, comprising:

A)    a pre-formed, solid, transfer tape layer of sealing cement of uniform thickness adapted to be disposed between said two members at the sealing areas thereof, and wherein said transfer tape layer of sealing cement is pre-formed into a closed frame defining an open area in the center thereof, said closed frame conforming to the size and shape of the sealing area of the members to be joined, and B)    at least three uniformly sized and shaped spacers disposed within said transfer tape layer of sealing cement, and comprising substantially identical dimensions in the direction corresponding to the thickness of the transfer tape layer, said dimension being smaller than the thickness of the transfer tape layer, whereby a precise separation gap is maintained between said members when said sealing cement transfer tape layer is cured while said members are pressed together.

Signed and Sealed this twenty-fourth Day of February 1976

[SEAL]

Attest:

RUTH C. MASON
Attesting Officer

C. MARSHALL DANN
Commissioner of Patents and Trademarks